US006885495B2

United States Patent
Liang et al.

(10) Patent No.: US 6,885,495 B2
(45) Date of Patent: *Apr. 26, 2005

(54) ELECTROPHORETIC DISPLAY WITH IN-PLANE SWITCHING

(75) Inventors: Rong-Chang Liang, Cupertino, CA (US); Jerry Chung, Moutain View, CA (US); David Chen, Buena Park, CA (US)

(73) Assignee: SiPix Imaging Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/198,729

(22) Filed: Jul. 16, 2002

(65) Prior Publication Data

US 2003/0035198 A1 Feb. 20, 2003
US 2004/0263946 A9 Feb. 20, 2003

Related U.S. Application Data

(63) Continuation-in-part of application No. 09/518,488, filed on Mar. 3, 2000.
(60) Provisional application No. 60/306,312, filed on Jul. 17, 2001.

(51) Int. Cl.[7] ............................ G20B 26/00; G09G 3/34
(52) U.S. Cl. ........................................ 359/296; 345/107
(58) Field of Search ........................... 359/296; 345/107

(56) References Cited

U.S. PATENT DOCUMENTS

| 3,229,607 A | 1/1966 | Battaglia |
| 3,612,758 A | 10/1971 | Evans et al. ............. 178/5.4 R |
| 3,668,106 A | 6/1972 | Ota ............................ 204/299 |
| 3,689,349 A | 9/1972 | Rowland |
| 3,697,679 A | 10/1972 | Hathaway ................ 178/6.6 A |

(Continued)

FOREIGN PATENT DOCUMENTS

| CA | 2340683 | 2/2001 |
| DE | 199 27 359.6 | 12/2001 |
| EP | 0990942 | 4/2000 |
| EP | 1065553 | 1/2001 |
| EP | 1 089 118 A2 | 4/2001 | ........... G02F/1/167 |

(Continued)

OTHER PUBLICATIONS

Cominsky, B. et al., "An Electrophoretic Ink For All–Printed Reflective Electronic Displays", Letters to Nature, pp. 253–255 (1998).
Dalisa , A.L., "Electrophoretic Display Technology", IEEE Transactions of Electron Devices, Jul. 1997, pp. 827–834.
Drzaic, P., "Liquid Crystal Dispersion", The PDLC Paradigm, (1995), pp. 1–9.
Harvey, T.G. "Replication Techniques For Micro–Optics", SPIE, vol. 3099, pp. 76–82 (1997).
Hopper, M.A. and Novotny, V., "An Electrophoretic Display, It's Properties, Model, and Addressing" IEEE Transactions on Electron Devices, vol. ED–26, No. 8, Aug. 1979, pp. 1148–1152.
U.S. Appl. No. 09/518,488, filed Mar. 3, 2000 (to be provided upon request).

(Continued)

*Primary Examiner*—David N. Spector
(74) *Attorney, Agent, or Firm*—Howrey Simon Arnold & White, LLP

(57) ABSTRACT

The present invention relates to an improved EPD which comprises the in plane switching mode. More specifically, the EPD of the present invention comprises isolated cells formed from microcups of well defined size, shape and aspect ratio and the movement of the particles in the cells is controlled by the in-plane switching mode. The EPD of the present invention may be produced in a continuous manufacturing process, and the display gives improved color saturation.

74 Claims, 3 Drawing Sheets

U.S. PATENT DOCUMENTS

| | | | |
|---|---|---|---|
| 3,885,964 A | 5/1975 | Nacci | |
| 3,892,568 A | 7/1975 | Ota et al. | |
| 3,908,052 A | 9/1975 | Sanders | |
| 3,928,671 A | 12/1975 | Robusto et al. | |
| 4,071,430 A | 1/1978 | Liebert | 204/299 |
| 4,093,534 A | 6/1978 | Carter et al. | 350/355 |
| 4,190,352 A | 2/1980 | Bruning | |
| 4,285,801 A | 8/1981 | Chiang | 204/299 |
| 4,655,897 A | 4/1987 | Disanto et al. | |
| 4,680,103 A | 7/1987 | Beilin Solomon I, et al. | 204/299 |
| 4,741,604 A | 5/1988 | Kornfeld | |
| 4,741,988 A | 5/1988 | Van der Zande et al. | 430/312 |
| 4,891,245 A | 1/1990 | Micale | |
| 4,924,257 A | 5/1990 | Jain | |
| 4,995,718 A | 2/1991 | Jachimowicz et al. | 353/31 |
| 5,177,476 A | 1/1993 | DiSanto et al. | |
| 5,200,120 A | 4/1993 | Sakai | |
| 5,274,481 A | 12/1993 | Kim | |
| 5,276,438 A | 1/1994 | DiSanto et al. | 345/107 |
| 5,279,511 A | 1/1994 | DiSanto et al. | 445/24 |
| 5,285,236 A | 2/1994 | Jain | |
| 5,345,251 A | 9/1994 | DiSanto et al. | |
| 5,380,362 A | 1/1995 | Schubert | 106/493 |
| 5,398,041 A | 3/1995 | Hyatt | |
| 5,403,518 A | 4/1995 | Schubert | 252/572 |
| 5,432,526 A | 7/1995 | Hyatt | |
| 5,450,220 A | 9/1995 | Onishi et al. | |
| 5,460,688 A | 10/1995 | DiSanto et al. | |
| 5,480,938 A | 1/1996 | Badesha et al. | |
| 5,573,711 A | 11/1996 | Hou et al. | 252/572 |
| 5,589,100 A | 12/1996 | Grasso et al. | 252/299.01 |
| 5,652,645 A | 7/1997 | Jain | |
| 5,699,097 A | 12/1997 | Takayama et al. | 347/171 |
| 5,731,860 A | 3/1998 | Harada et al. | |
| 5,739,889 A | 4/1998 | Yamada et al. | |
| 5,745,094 A | 4/1998 | Gordon, II et al. | |
| 5,835,174 A | 11/1998 | Clikeman et al. | 349/86 |
| 5,843,333 A | 12/1998 | Hakemi | |
| 5,872,552 A | 2/1999 | Gordon, II et al. | |
| 5,877,848 A | 3/1999 | Gillette et al. | |
| 5,895,541 A | 4/1999 | Kobayashi et al. | |
| 5,914,806 A | 6/1999 | Gordon II et al. | 359/296 |
| 5,930,026 A | 7/1999 | Jacobson et al. | 359/296 |
| 5,942,154 A | 8/1999 | Kim et al. | |
| 5,943,113 A | 8/1999 | Ishihashi | |
| 5,956,112 A | 9/1999 | Fujimori et al. | |
| 5,961,804 A | 10/1999 | Jacobson et al. | 204/606 |
| 5,967,871 A | 10/1999 | Kaake et al. | |
| 5,976,405 A | 11/1999 | Clikeman et al. | 252/299.01 |
| 5,978,062 A | 11/1999 | Liang et al. | |
| 5,985,084 A | 11/1999 | Summersgill et al. | |
| 5,995,190 A | 11/1999 | Nagae et al. | |
| 6,017,584 A | 1/2000 | Albert et al. | 427/213.3 |
| 6,018,383 A | 1/2000 | Dunn et al. | |
| 6,037,058 A | 3/2000 | Clikeman et al. | 428/402.2 |
| 6,064,508 A | 5/2000 | Forgette et al. | |
| 6,067,185 A | 5/2000 | Albert et al. | 359/296 |
| 6,111,598 A | 8/2000 | Faris | 348/57 |
| 6,113,810 A | 9/2000 | Hou et al. | 252/572 |
| 6,113,836 A | 9/2000 | Sakai et al. | |
| 6,120,588 A | 9/2000 | Jacobson | 106/31.16 |
| 6,120,839 A | 9/2000 | Comiskey | 427/213.3 |
| 6,120,946 A | 9/2000 | Johnson et al. | |
| 6,166,797 A | 12/2000 | Bruzzone et al. | |
| 6,172,798 B1 | 1/2001 | Albert et al. | 359/296 |
| 6,184,856 B1 | 2/2001 | Gordon, II et al. | 345/107 |
| 6,191,250 B1 | 2/2001 | Aida et al. | |
| 6,239,896 B1 | 5/2001 | Ikeda | |
| 6,252,624 B1 | 6/2001 | Yuasa et al. | 348/56 |
| 6,312,304 B1 | 11/2001 | Duthaler et al. | 445/24 |
| 6,319,381 B1 | 11/2001 | Nemelka | |
| 6,327,072 B1 | 12/2001 | Comiskey et al. | 359/296 |
| 6,337,761 B1 | 1/2002 | Rogers et al. | 359/296 |
| 6,392,785 B1 | 5/2002 | Albert et al. | |
| 6,392,786 B1 | 5/2002 | Albert | 359/296 |
| 6,400,430 B2 | 6/2002 | Nakao et al. | |
| 6,400,492 B1 | 6/2002 | Morita et al. | |
| 6,512,626 B1 | 1/2003 | Schmidt | |
| 6,514,328 B1 | 2/2003 | Katoh et al. | |
| 6,524,153 B1 | 2/2003 | Ikeda et al. | |
| 6,525,865 B2 | 2/2003 | Katase | |
| 6,639,580 B1 * | 10/2003 | Kishi et al. | 345/107 |
| 6,652,075 B2 | 11/2003 | Jacobson | |
| 6,751,007 B2 * | 6/2004 | Liang et al. | 359/296 |
| 2001/0009352 A1 | 7/2001 | Moore | |
| 2002/0018043 A1 | 2/2002 | Nakanishi | |
| 2002/0029969 A1 | 3/2002 | Yager et al. | |
| 2002/0126249 A1 | 9/2002 | Liang et al. | 349/187 |
| 2002/0182544 A1 | 12/2002 | Chan-Park et al. | 430/311 |
| 2002/0188053 A1 | 12/2002 | Zang et al. | 524/474 |
| 2002/0196525 A1 | 12/2002 | Chen et al. | |

FOREIGN PATENT DOCUMENTS

| | | | |
|---|---|---|---|
| EP | 1195603 | 4/2002 | |
| JP | 49-005598 | 1/1974 | |
| JP | 49-024695 | 3/1974 | |
| JP | 57104116 | 6/1982 | |
| JP | 59-034518 | 2/1984 | |
| JP | 59-171930 | 9/1984 | G02F/1/19 |
| JP | 60-205452 | 10/1985 | |
| JP | 62-099727 | 5/1987 | |
| JP | 62-203123 | 9/1987 | |
| JP | 64-86116 | 3/1989 | |
| JP | 01-300232 | 12/1989 | |
| JP | 02223934 | 9/1990 | |
| JP | 02-223936 | 9/1990 | |
| JP | 02284125 | 11/1990 | |
| JP | 02284126 | 11/1990 | |
| JP | 04-113386 | 4/1992 | |
| JP | 6242423 | 9/1994 | |
| JP | 09-160052 | 6/1997 | |
| JP | 11-202804 | 7/1999 | |
| JP | 2000 035677 | 2/2000 | |
| JP | 2000 075497 | 3/2000 | |
| JP | 2001 042118 | 2/2001 | |
| JP | 2001 056653 | 2/2001 | |
| WO | WO 97/04398 | 2/1997 | |
| WO | WO 98/57226 | 12/1998 | |
| WO | WO 99/08151 | 2/1999 | |
| WO | WO 99/53373 | 10/1999 | |
| WO | WO 99/56171 | 11/1999 | G02F/1/167 |
| WO | WO 00/03291 | 1/2000 | |
| WO | WO 00/36649 | 6/2000 | |
| WO | WO 00/60410 | 10/2000 | G02F/1/167 |
| WO | WO 00/77571 | 12/2000 | |
| WO | WO 01/67170 | 9/2001 | G02F/1/167 |
| WO | WO 02/01281 | 1/2002 | |

OTHER PUBLICATIONS

U.S. Appl. No. 09/606,654, filed Jun. 28, 2000 (to be provided upon request).

Harbour, J.R. et al., "Subdivided Electrophoretic Display", Xerox Disclosure Journal, vol. 4, No. 6 (1979).

Kishi, E.et al., "5.1: Developments of In–Plane EPD", Canon Research Center, SID 00' Digest, pp. 24–27 (2000).

Lewis, J.C., et al., "Gravitational, Inter–Particle–Electrode Forces in Electophorectic Display", Proceedings of the S.I.D., vol. 18/3&4 (1977).

Murau, P., et al., "The Understanding and Elimination of Some Suspension Instabilitites in an Electrophoretic Display", J. Appl. Phys., 49(9), (1978).

Nakamura, E., et al., "Development of Electrophorectic Display Using Microcapsulated Suspension", SID Digest, (1998), pp. 1014–1017.

Ota, I., et al., "Electrophoretic Image Display EPID Panel", Proceedings of the IEEE, vol. 1, No. 7, Jul. 1973.

Singer, B. and Dalisa, A.L., "An X–Y Addressable Electrophoretic Display", Proceeding of the S.I.D., vol. 18/3&4, (1977).

Slafer, D.W., et al., "Continuous Manufacturing of Thin Cover Sheet Optical Media", SPIE, vol. 1663, (1992), pp. 323–335.

Swanson, S. et al., "5.2: High Performance Electrophoretic Displays", IBM Almaden Research Center, vol. ED 26, No. 8, pp. 1148–1152, (1979).

U.S. Appl. No. 09/518,488, filed Mar. 3, 2000, Liang et al.

Bryning et al., "Reverse–Emulsion Electrophoretic Display (REED)" *SID 98 Digest* 1018–1021 (1998).

Inoue, S., et al., "High Resolution Microencapsulated Electrophoretic Display (EPD) Driven by Poly–Si TFTs With Four–Level Grayscale" *IEEE Transactions on Electron Devices* 49(8):1532–1539 (2002).

J. C. Lewis, "Electrophoretic Displays", Allen Clark Rsearch Centre, The Plessey Company Ltd., Caswell, Towcester, Northants, England, pp–223–240.

Kazlas, P., et al., "SVGA Microencapsulated Electrophoretic Active Matrix Display for Information Applicances" *SID 01 Digest* 152–155 (2001).

Matsuda Y. "Newly designed, high resolution, active matrix addressing in plane EPD" *IDW 02 EP2–3* 1341–1344 (2002).

Ota, et al., "Development in Electrophoretic Displays" *Proc. of SID* 18:243–254 (1977).

Murau, P., "Characteristics of an X–y Addressed Electrophoretic Image display (EPID)", *SID Digest*, 141 (1984).

Singer, B. et al, "An X–Y Addressable Electrophoretic Display", *Proceedings of the SID*, vol. 18/3&4, 255 (1977).

* cited by examiner

☐ WHITE
▦ COLOR

☐ WHITE
▦ COLOR

▥ RED
▧ GREEN
▤ BLUE
☐ WHITE

▥ RED
▧ GREEN
▤ BLUE
▦ BLACK

▥ RED
▧ GREEN
▤ BLUE
▦ BLACK

▥ RED
▧ GREEN
▤ BLUE
☐ WHITE

ELECTROPHORETIC DISPLAY WITH IN-PLANE SWITCHING

This application is a continuation-in-parts of U.S. application Ser. No. 09/518,488, filed Mar. 3, 2000. This application also claims the benefit of provisional application 60/306,312, filed Jul. 17, 2001.

BACKGROUND

The electrophoretic display (EPD) is a non-emissive device based on the electrophoresis phenomenon influencing charged pigment particles suspended in a colored dielectric solvent. This general type of display was first proposed in 1969. An EPD typically comprises a pair of opposed, spaced-apart plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively are needed to drive the displays. In contrast, an array of thin film transistors (TFT) on the bottom plate and a common, non-patterned transparent conductor plate on the top viewing substrate are required for the active type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages. No backlight is needed in this type of reflective EPD displays.

A transmissive EPD is disclosed in U.S. Pat. No. 6,184,856 in which a backlight, color filters, and substrates with two transparent electrodes are used. The electrophoretic cells serve as a light valve. In the collected state, the particles are positioned to minimize the coverage of the horizontal area of the cell and allow the backlight to pass through the cell. In the distributed state, the particles are positioned to cover the horizontal area of the pixel and scatter or absorb the backlight. However, the backlight and color filter used in this device consume a great deal of power and are not desirable for hand-held devices such as PDAs (personal digital assistants) and e-books.

Besides the normal top/bottom electrode switching mode of EPDs, reflective "in-plane" switching EPDs have been disclosed in E. Kishi, et al., "5.1: development of In-Plane EPD", Canon Research Center, SID 00 Digest, pages 24–27 (2000) and Sally A. Swanson, et al., "5.2: High Performance Electrophoretic Displays", IBM Almaden Research Center, SID 00 Digest, pages 29–31, (2000). However, only monochrome in-plane switching EPDs are disclosed in these references. To prepare a multicolor display, either color filters or isolated color pixels or cell structures are needed for color separation and rendition. Color filter is typically expensive and not power-efficient. On the other hand, the preparation of isolated pixels or cells for color separation and rendering in the in-plane switching mode has not been taught previously.

EPDs of different pixel or cell structures have been reported in prior art, for example, the partition-type EPD (M. A. Hopper and V. Novotny, IEEE Trans. Electr. Dev., Vol ED 26, No. 8, pp 1148–1152 (1979)) and the microencapsulated EPD (U.S. Pat. Nos. 5,961,804 and 5,930,026), and each of these has its own problems as noted below.

In a partition-type EPD, there are partitions between the two electrodes for dividing the space into smaller cells in order to prevent undesired movements of the particles such as sedimentation. However, difficulties are encountered in the formation of the partitions, the process of filling the display with the fluid, enclosing the fluid in the display, and keeping the suspensions of different colors separated from each other.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules are typically prepared in an aqueous solution and, to achieve a useful contrast ratio, their mean particle size is relatively large (50–150 microns). The large microcapsule size results in a poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge-controlling agent is often needed in this type of EPDs. However, the microencapsulation process in an aqueous solution imposes a limitation on the type of charge-controlling agents that can be used. Other drawbacks associated with the microcapsule system include poor resolution and poor addressability for color applications.

An improved EPD technology was recently disclosed in co-pending applications, U.S. Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01281) and U.S. Ser. No. 09/784,972, filed on Feb. 15, 2001, all of which are incorporated herein by reference. The improved EPD comprises closed isolated cells formed from microcups of well-defined shape, size and aspect ratio and filled with charged pigment particles dispersed in a dielectric solvent. The electrophoretic fluid is isolated and sealed in each microcup.

The microcup structure, in fact, enables a format flexible, efficient roll-to-roll continuous manufacturing process for the preparation of EPDs. The displays can be prepared on a continuous web of conductor film such as ITO/PET by, for example, (1) coating a radiation curable composition onto the ITO/PET film, (2) making the microcup structure by a microembossing or photolithographic method, (3) filling the electrophoretic fluid and sealing the microcups, (4) laminating the sealed microcups with the other conductor film, and (5) slicing and cutting the display to a desirable size or format for assembling.

One advantage of this EPD design is that the microcup wall is in fact a built-in spacer to keep the top and bottom substrates apart at a fixed distance. The mechanical properties and structural integrity of microcup displays are significantly better than any prior art displays including those manufactured by using spacer particles. In addition, displays involving microcups have desirable mechanical properties including reliable display performance when the display is bent, rolled, or under compression pressure from, for example, a touch screen application. The use of the microcup technology also eliminates the need of an edge seal adhesive which would limit and predefine the size of the display panel and confine the display fluid inside a predefined area. The display fluid in a conventional display prepared by the edge sealing adhesive method will leak out completely if the display is cut in any way, or if a hole is drilled through the display. The damaged display will be no longer functional. In contrast, the display fluid in the display prepared by the microcup technology is enclosed and isolated in each cell. The microcup display may be cut to almost any dimension without the risk of damaging the display performance due to the loss of display fluids in the active areas. In other words, the microcup structure enables a format flexible display manufacturing process, wherein the process produces a continuous output of displays in a large sheet format which can be sliced and diced to any desired format. The isolated microcup or cell structure is particularly important, when cells are filled with fluids of different specific properties such as colors and switching rates. Without the microcup structure, it will be very difficult to prevent the fluids in adjacent areas from intermixing, or being subject to cross-talk during operation.

Multi-color displays may thus be manufactured by using a spatially adjacent array of small pixels formed of microcups filled with dyes of different colors (e.g., red, green or blue). However there is a major deficiency in this type of system with the traditional top/bottom electrode switching mode. The white light reflected from the "turned-off" colored pixels greatly reduces the color saturation of the "turned-on" colors. More details in this regard are given in the following "Detailed Description" section.

While this deficiency may be remedied by an overlaid shutter device such as a polymer dispersed liquid crystal to switch each pixel to the black color, the disadvantage of this approach is the high cost of the overlaid device and the complicated driving circuit design.

Thus, there is still a need for an EPD with improved properties that can also be prepared in an efficient manner.

SUMMARY OF THE INVENTION

The present invention relates to an improved EPD which comprises the in plane switching mode for image formation. More specifically, the EPD of the present invention comprises isolated cells formed from microcups of well defined size, shape and aspect ratio and the movement of the particles in the cells is controlled by the in-plane switching mode. The EPDs of the present invention may be produced in a continuous roll-to-roll manufacturing process, and the resultant displays have improved color saturation and contrast ratio.

BRIEF DESCRIPTION OF THE DRAWINGS

It is noted that all figures are shown as schematic and are not to scale.

DETAILED DESCRIPTION OF THE INVENTION

Unless defined otherwise in this specification, all technical terms are used herein according to their conventional definitions as they are commonly used and understood by those of ordinary skill in the art. The terms "cell", "microcup", "well-defined", "aspect ratio", and "imagewise exposure" are as defined in the co-pending applications identified above.

The term "isolated" refers to the electrophoretic cells which are individually sealed and the fluid in the cells may not be transferred from one cell to the other cells.

Figure 1:
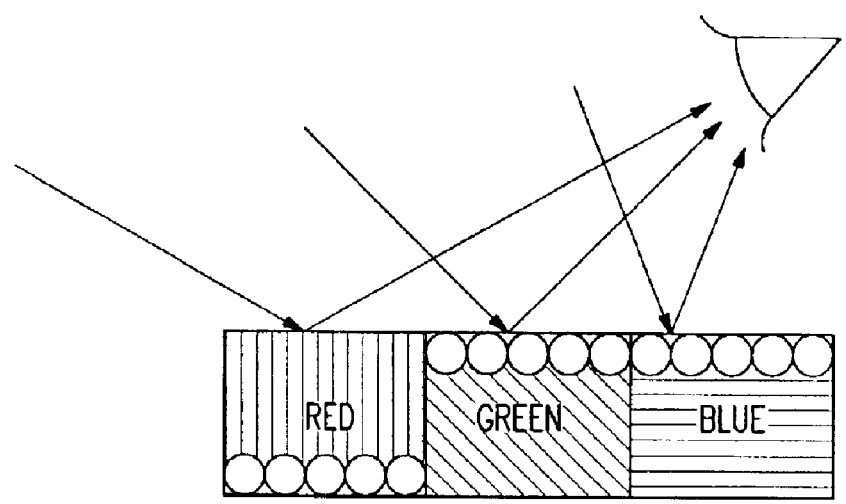
FIG. 1 illustrates the common deficiency of the traditional EPD with only the top/bottom switching mode.

I. The Disadvantages of Electrophoretic Display with the Traditional Top/Bottom Switching The EPD of FIG. 1 has conventional top/bottom electrode switching mode. The cells are filled with a suspension in which white charged particles are dispersed in a colored (red, green and blue) dielectric solvent. All three cells in FIG. 1 are shown charged with a voltage difference between the top and bottom electrodes (not shown). In the green and blue cells, the white particles migrate to the top viewing electrode which is transparent, and as a result, the color of the particles (i.e., white) is reflected to the viewer through the transparent conductor film in the two cells. In the red cell, the white particles migrate to the bottom of the cell, and the color of the solvent (i.e., red) is seen through the top transparent conductor film. In FIG. 1, the white light reflected from the green and blue cells dramatically reduces the saturation and contrast ratio of the red color.

In addition to the above mentioned problem, low solubility and poor fastness of the dyes in dielectric solvents of very low polarity, such as perfluoro and hydrocarbon solvents, have been a challenge for achieving high contrast ratio in the top/down type of EPDs.

II. Electrophoretic Display of the Present Invention

Figure 2:
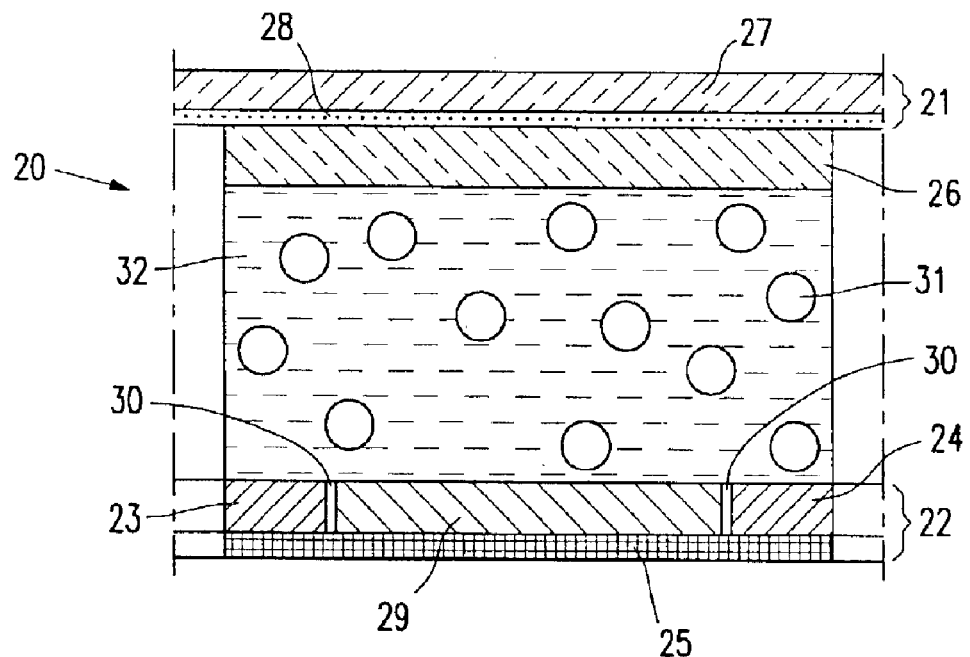
FIG. 2 illustrates a typical electrophoretic cell of the present invention and the general locations of the in-plane switching electrodes.

FIG. 2 illustrates a typical electrophoretic cell of the present invention. The cell (20) comprises a top layer (21) and a bottom layer (22). The bottom layer has the in-plane switching electrodes (23) and (24) and the background layer (25). There is a common electrode (29) between the two in-plane electrodes separated by gaps (30). Alternatively, the bottom layer may have only one in-plane switching electrode, and one common electrode with a gap in between. Another alternative is where the background layer (25) is on top of the electrodes in the bottom layer (not shown). The in-plane electrode layer may also serve as the background layer and in this case the in-plane electrode(s) may be white or colored.

Typically, the cells of FIG. 2 are filled with a dispersion of colored particles (31) in a clear dielectric solvent (32). The particles may be white, black or colored (i.e., red, green or blue). The background layer (25) may be colorless, white, black or colored. The filled cells are subsequently sealed with a sealing layer (26). The top layer (21) having a transparent insulator layer (27) and preferably an adhesive layer (28) is then laminated over the sealed cells.

Preferably the microcup array is prepared in an up-side-down manner. In this scenario, the microcup array is prepared on the top transparent insulator substrate by either microembossing or photolithography as disclosed in the co-pending patent applications, U.S. Ser. No. 09/518,488, filed on Mar. 3, 2000 (corresponding to WO01/67170), U.S. Ser. No. 09/759,212, filed on Jan. 11, 2001, U.S. Ser. No.

09/606,654, filed on Jun. 28, 2000 (corresponding to WO02/01281) and U.S. Ser. No. 09/784,972, filed on Feb. 15, 2001, all of which are incorporated herein by reference. The microcups are filled with the electrophoretic fluid and sealed subsequently with a sealing layer. The bottom layer which contains the patterned electrodes and preferably an adhesive layer is then laminated over the sealed microcup. The color background may be added by painting, printing, coating or laminating a color layer to the bottom electrode substrate.

One of the advantages of the in-plane switching mode is the possibility of making the microcups on a clear plastic insulator substrate. This eliminates the risk of breaking the brittle conductor electrode such as ITO/PET during the microembossing and other web handling steps. The patterned in-plane conductor film will only be used at the last step for lamination onto the filled and sealed microcups to complete the making of the display panel.

(1) Reflective Monochrome Display

Figure 3A:
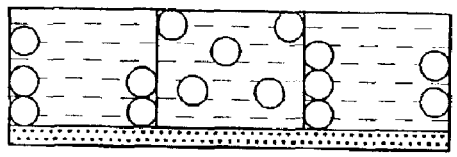
FIGS. 3A and 3B illustrate the monochrome display of the present invention.

In the cell as shown in FIG. 3A, white particles are dispersed in a clear, colorless dielectric solvent. The background of all cells is of the same color (black, blue, cyan, red, magenta, etc.). When there is a voltage difference between the common (not shown) and the two in-plane switching electrodes (not shown), the white particles migrate to the sides of the cells, resulting in the color of the background being seen through the top transparent opening. When there is no voltage difference between the common and the two in-plane electrodes, the white particles are distributed in the dielectric solvent and as a result, the color of the particles (i.e., white) is seen through the top transparent insulator layer.

Figure 3B:
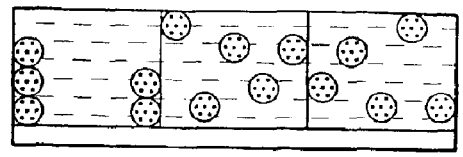

Alternatively, as shown in FIG. 3B, particles of the same color are dispersed in a clear, colorless dielectric solvent in all cells and the background of the cells is white. When there is a voltage difference between the common (not shown) and the two in-plane switching electrodes (not shown), the colored particles migrate to the sides of the cells, resulting in the color of the background (i.e., white) being seen through the top transparent opening. When there is no voltage difference between the two in-plane electrodes, the colored particles are distributed in the dielectric solvent and as a result, the color of the particles is seen through the top transparent layer.

(2) Reflective Multiple Color Display

FIGS. 4A–4D illustrate the multiple color displays of the present invention.

Figure 4A:
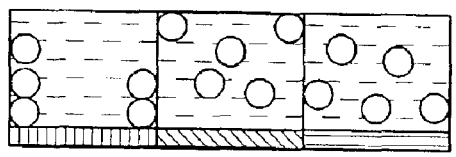
FIGS. 4A–4D illustrate the various multiple color scenarios of the present invention.

In FIG. 4A, the cells are filled with a colorless dielectric solvent with white charged particles dispersed therein, and have different background colors (i.e., red, green or blue). When there is a voltage difference between the in-plane electrodes (not shown), the white particles migrate to either side of the cell, the color of the background (i.e., red, green or blue) is seen from the top transparent opening. When there is no voltage difference between the in-plane electrodes, the particles are distributed in the dielectric solvent resulting in the white color (i.e., the color of the particles) being seen from the top transparent opening.

Figure 4B:
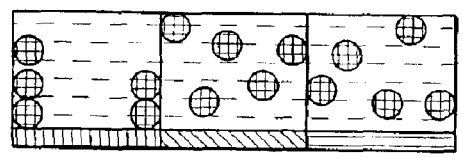

In FIG. 4B, the cells are filled with a colorless dielectric solvent with black particles dispersed therein, and have different background colors (i.e., red, green or blue). When there is a voltage difference between the in-plane electrodes (not shown), the particles migrate to either side of the cell, the color of the background (i.e., red, green or blue) is seen from the top transparent opening. When there is no voltage difference between the in-plane electrodes, the particles are distributed in the dielectric solvent, resulting in the black color (i.e., the color of the particles) being seen from the top transparent opening.

Figure 4C:
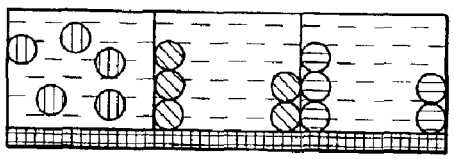

FIG. 4C shows the cells filled with a colorless dielectric solvent with particles of different colors (i.e., red, green or blue) dispersed therein. The background of the cells is black. When there is a voltage difference between the in-plane electrodes (not shown), the colored charged particles migrate to either side of the cell, the color of the background (i.e., black) is seen from the top transparent opening. When there is no voltage difference between the in-plane electrodes, the colored particles are distributed in the dielectric solvent, resulting in the color of the particles (i.e., red, green or blue) being seen from the top transparent opening. In this design, the black state is of high quality.

Figure 4D:
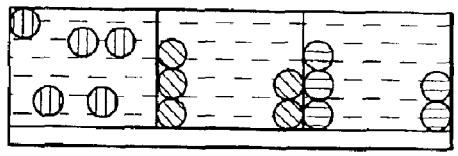

In FIG. 4D, the cells are filled with a colorless dielectric solvent with particles of different colors (red, green or blue) dispersed therein. The background of the cells is white. When there is a voltage difference between the in-plane electrodes (not shown), the particles migrate to either side of the cell, the color of the background (i.e., white) is seen from the top transparent opening, resulting in a high quality white state. When there is no voltage difference between the in-plane electrodes, the particles are distributed in the dielectric solvent, resulting in the color of the particles (i.e., red, green or blue) being seen from the top transparent opening.

As shown in FIGS. 4A–4D, the in-plane switching mode allows the particles to move in the planar (left/right) direction, and different color combinations of particles, background, and fluid, wherein each is individually white, black, red, green or blue, can be used to generate various multi-color EPDs.

In addition, the particles in the dielectric solvent may be of mixed colors and the cells have the same background color.

In an alternative reflective display of the present invention, the top transparent viewing layer of the display may be colored or by adding a color filter. In this case, the cells are filled with an electrophoretic composition comprising white charged particles in a clear colorless or colored dielectric solvent and the background of the cells may be black. In a monochrome display, the transparent viewing layer on each pixel is of the same color (such as black, red, green, blue, yellow, cyan, magenta, etc.). In a multiple color display, the transparent viewing layers may be of different colors.

III. Preparation of Microcup Array of the Present Invention

The microcups generally may be manufactured by microembossing or photolithography as disclosed in U.S. patent application Ser. Nos. 09/518,488 filed Mar. 3, 2000 (corresponding to WO01/67170) and U.S. Ser. No. 09/784,972 filed on Feb. 15, 2001.

III(a) Preparation of the Microcup Array by Microembossing Preparation of the Male Mold The male mold may be prepared by any appropriate method, such as a diamond turn process or a photoresist process followed by either etching or electroplating. A master template for the male mold may be manufactured by any appropriate method, such as electroplating. With electroplating, a glass base is sputtered with a thin layer (typically 3000 Å) of a seed metal such as chrome inconel. It is then coated with a layer of photoresist and exposed to radiation, such as ultraviolet (UV). A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition as described in "Continuous manufacturing of thin cover sheet optical media", SPIE Proc. Vol. 1663, pp. 324 (1992). The floor of the mold is typically between about 50 to 400 microns thick. The master can also be made using other microengineering techniques including e-beam writing, dry etching, chemical etching, laser writing or laser interference as described in "Replication techniques for micro-optics", SPIE Proc. Vol. 3099, pp. 76–82 (1997). Alternatively, the mold can be made by photomachining using plastics, ceramics or metals.

The male mold thus prepared typically has protrusions between about 1 to 500 microns, preferably between about 2 to 100 microns, and most preferably about 4 to 50 microns. The male mold may be in the form of a belt, a roller, or a sheet. For continuous manufacturing, the belt type of mold is preferred. Prior to applying a UV curable resin composition, the mold may be treated with a mold release to aid in the demolding process.

Microcups may be formed either in a batchwise process or in a continuous roll-to-roll process as described in U.S. Ser. No. 09/784,972 filed on Feb. 15, 2001.

In the first step of the microembossing process, a UV curable resin is first coated on a substrate, preferably a transparent insulator, by any appropriate means, such as roller coating, die coating, slot coating, slit coating, doctor blade coating, and the like. Suitable transparent insulator substrates include polyethylene terephthalate, polyethylene naphthate, polyaramid, polyimide, polycycloolefin, polysulfone, epoxy and their composites. The radiation curable material used is a thermoplastic or thermoset precursor, such as multifunctional acrylate or methacrylate, vinylether, epoxide and their oligomers, polymers and the like. Multifunctional acrylates and their oligomers are the most preferred. A combination of a multifunctional epoxide and a multifunctional acrylate is also very useful to achieve desirable physico-mechanical properties. The UV curable resin may be degassed prior to dispensing and may optionally contain a solvent. The solvent, if present, readily evaporates.

The radiation curable material coated on the substrate is embossed by the male mold under pressure. If the male mold is metallic and opaque, the plastic insulator is typically transparent to the actinic radiation used to cure the resin. Conversely, the male mold can be transparent and the plastic insulator can be opaque to the actinic radiation. The plastic insulator is preferably transparent because it is typically the viewing side. In this case, the electrodes can be opaque. Alternatively, the microembossing can be performed on the substrate containing the electrodes.

After exposure to radiation, the radiation curable material becomes hardened. The male mode is then removed exposing the microcups formed.

III(b) Preparation of Microcup Array by Photolithography

Figure 5A:
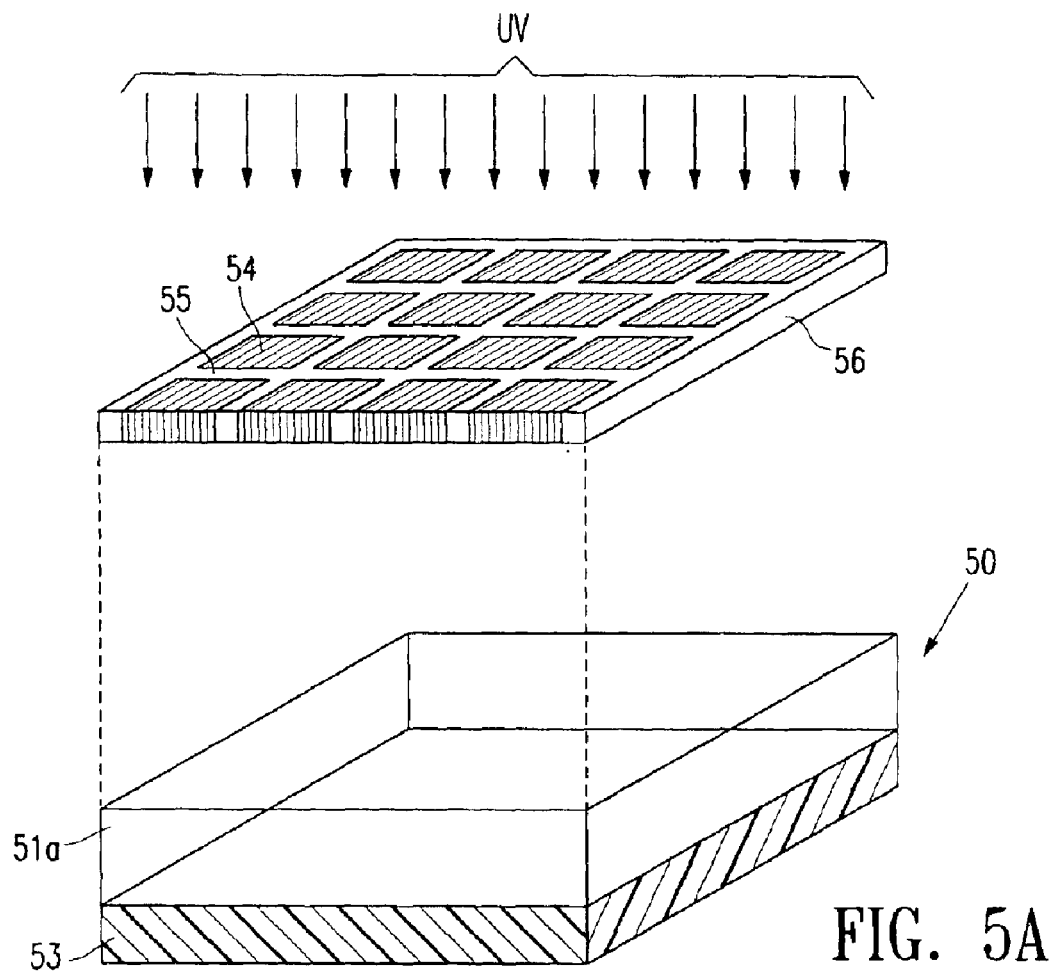
FIGS. 5A and 5B illustrate the manufacture of microcups involving imagewise photolithographic exposure through a photomask.
Figure 5B:
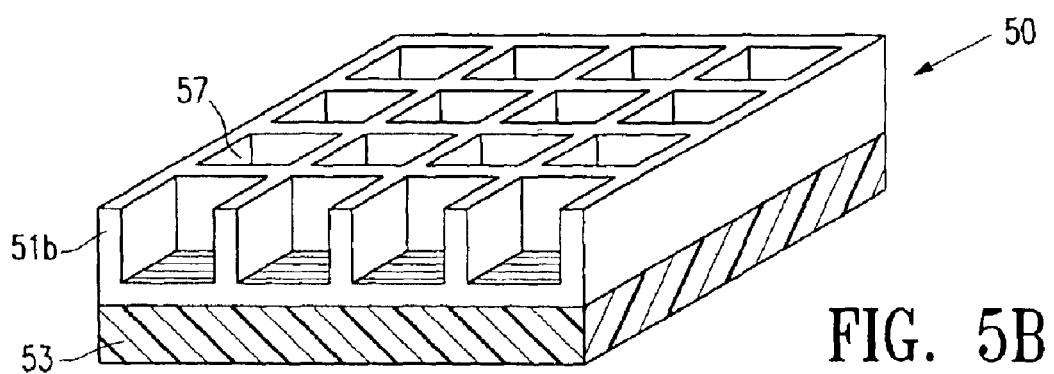

The photolithographic process for preparation of the microcup array is shown in FIGS. 5A and 5B.

As shown in FIGS. 5A and 5B, the microcup array (50) may be prepared by exposure of a radiation curable material (51*a*), coated by any known methods onto an insulator substrate base (53), to UV light (or alternatively other forms of radiation, electron beams and the like) through a mask (56) to form walls (51*b*) corresponding to the image projected through the mask (56).

In the photomask (56) in FIG. 5A, the dark squares (54) represent the area opaque to the radiation employed, and the space (55) between the dark squares represents the radiation-transparent area. The UV radiates through the opening area (55) onto the radiation curable material (51*a*).

As shown in FIG. 5B, the exposed areas (51*b*) become hardened and the unexposed areas (protected by the opaque area (54) of the mask (56)) are then removed by an appropriate solvent or developer to form the microcups (57). The solvent or developer is selected from those commonly used for dissolving or dispersing radiation curable materials such as methylethylketone, toluene, acetone, isopropanol or the like.

Alternatively, the exposure can be done by placing the photomask underneath the insulator substrate. In this case, the substrate must be transparent to the radiation wavelength used for exposure.

The openings of the microcups prepared according to the methods described above may be round, square, rectangular, hexagonal, or any other shape. The partition area between the openings is preferably kept small in order to achieve a high color saturation and contrast while maintaining desirable mechanical properties. Consequently the honeycomb-shaped opening is preferred over, for example, the circular opening.

For reflective electrophoretic displays, the dimension of each individual microcup may be in the range of about $10^2$ to about $1 \times 10^6$ $\mu m^2$, preferably from about $10^3$ to about $1 \times 10^5$ $\mu m^2$. The depth of the microcups is in the range of about 5 to about 200 microns, preferably from about 20 to about 100 microns. The opening to the total area ratio, total area being defined as that of one cup including walls measured from wall centers, is in the range of from about 0.2 to about 0.95, preferably from about 0.5 to about 0.9. The distances of the openings usually are in the range of from about 15 to about 450 microns, preferably from about 25 to about 300 microns from edge to edge of the openings.

III(c) Sealing of the Microcups the microcups are filled with an eletrophoretic fluid, they are sealed. The critical step of sealing of the microcups may be accomplished in a number of ways. A preferred approach is to disperse a UV curable composition into an electrophoretic fluid comprising charged pigment particles dispersed in a colored dielectric solvent. The suitable UV curable materials include acrylates, methacrylates, styrene, alpha-methylstyrene, butadiene, isoprene, allyacrylate, polyvalent acrylate or methacrylate, cyanoacrylates, polyvalent vinyl including vinylbenzene, vinylsilane, vinylether, polyvalent epoxide, polyvalent isocyanate, polyvalent allyl, and oligomers or polymers containing crosslinkable functional groups. The UV curable composition is immiscible with the dielectric solvent and has a specific gravity lower than that of the electrophoretic fluid, i.e., the combination of the dielectric solvent and the pigment particles. The two components, UV curable composition and the electrophoretic fluid, are thoroughly blended in an in-line mixer and immediately coated onto the microcups with a precision coating mechanism such as Myrad bar, gravure, doctor blade, slot coating or slit coating. Excess fluid is removed by a wiper blade or a similar device. A small amount of a weak solvent or solvent mixture such as isopropanol or methanol may be used to clean the residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be sealed by curing the supernatant UV curable layer during or after it floats to the top. UV or other forms of radiation such as visible light, IR and electron beam may be used to cure the sealing layer and seal the microcups. Alternatively, heat or moisture may also be employed to cure the sealing layer and seal the microcups, if heat or moisture curable compositions are used.

A preferred group of dielectric solvents exhibiting desirable density and solubility discrimination against acrylate monomers and oligomers are halogenated hydrocarbons and their derivatives. Surfactants may be used to improve the adhesion and wetting at the interface between the electrophoretic fluid and the sealing materials. Surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the sealing precursor may be coated sequentially into the microcups to prevent intermixing, if the sealing precursor is at least partially compatible with the dielectric solvent. Thus, the sealing of the microcups may be accomplished by overcoating a thin layer of sealing material which is hardenable by radiation, heat, moisture or interfacial reactions on the surface of the filled microcups. Volatile organic solvents may be used to adjust the viscosity and the thickness of the coatings. When a volatile solvent is used in the overcoat, it is preferred that it is immiscible with the dielectric solvent to reduce the degree of intermixing between the sealing layer and the electrophoretic fluid. To further reduce the degree of intermixing, it is highly desirable that the specific gravity of the overcoating is significantly lower than that of the electrophoretic fluid. In the copending patent application, U.S. Ser. No. 09/874,391, filed Jun. 4, 2001, thermoplastic elastomers have been disclosed as the preferred sealing material.

Examples of useful thermoplastic elastomers include ABA, and (AB)n type of di-block, tri-block, and multi-block copolymers wherein A is styrene, α-methylstyrene, ethylene, propylene or norbonene; B is butadiene, isoprene, ethylene, propylene, butylene, dimethylsiloxane or propylene sulfide; and A and B cannot be the same in the formula. The number, n, is $\geq 1$, preferably 1–10. Particularly useful are di-block or tri-block copolymers of styrene or α-methylstyrene such as SB (poly(styrene-b-butadiene)), SBS (poly(styrene-bbutadiene-b-styrene)), SIS (poly(styrene-b-isoprene-b-styrene)), SEBS (poly(styrene-b-ethylene/butylenes-b-styrene)) poly(styrene-b-dimethylsiloxane-b-styrene), poly((α-methylstyrene-b-isoprene), poly(α-methylstyrene-b-isoprene-b-α-methylstyrene), poly(α-methylstyrene-b-propylene sulfide-b-α-methylstyrene), poly(α-methylstyrene-b-dimethylsiloxane-b-α-methylstyrene).

Alternatively, interfacial polymerization followed by UV curing has been found very beneficial to the sealing process. Intermixing between the electrophoretic layer and the overcoat is significantly suppressed by the formation of a thin barrier layer at the interface by interfacial polymerization. The sealing is then completed by a post curing step, preferably by UV radiation. The two-step overcoating process is particularly useful when the dye used is at least partially soluble in the thermoset precursor.

III(d) Lamination of the Microcups

The sealed microcups are then laminated with a top layer comprising a patterned in plane conductor film and preferably an adhesive layer. Suitable adhesive materials include acrylic and rubber types of pressure sensitive adhesives, UV curable adhesives containing for example, multifunctional acrylates, epoxides, or vinylethers, and moisture or heat curable adhesives such as epoxy, polyurethane, and cyanoacrylate.

The cells prepared from the methods of Sections III(a)-III(d) may be used in an up-side-down manner with the transparent viewing layer at the top and the layer with the in-plane electrodes at the bottom.

III(e) Alternative Methods

Alternatively, in the microembossing process, the UV curable resin is dispensed over the male mold by any appropriate means, such as coating, dipping, pouring and the like. The dispenser may be moving or stationary. A patterned in-plane conductor film on a plastic substrate such as polyethylene terephthalate, polyethylene naphthate, polyaramid, polyimide, polycycloolefin, polysulfone, epoxy and their composites is then overlaid on the UV curable resin. Pressure may be applied to ensure proper bonding between the resin and the plastic substrate and to control the thickness of the floor of the microcups. If the male mold is metallic and opaque, the plastic substrate is typically transparent to the actinic radiation used to cure the resin. Conversely, the male mold can be transparent and the plastic substrate can be opaque to the actinic radiation.

After exposure to UV radiation, the UV curable resin becomes hardened, and the male mold may then he removed. The microcup arrays formed are filled and sealed as described above. The sealed microcups are then laminated with a transparent insulator layer preferably using an adhesive.

Although less preferred, the photolithographic exposure may also be performed on the substrate having the in-plane electrodes. A radiation curable material is coated on the patterned conductor film. The microcups are formed by exposure of the radiation curable material to radiation through a photomask as shown in FIG. 5 and described in Section III(b) above.

The microcups thus prepared are then filled and sealed as described above and laminated with a transparent insulator layer, preferably with an adhesive.

In any of the methods for the preparation of the microcups disclosed in this section, a substrate containing an array of thin film transistors (TFT) may be used as the bottom in-plane electrode layer and in this case the TFT layer also provides an active driving mechanism.

IV. Preparation of the Suspensions

The suspensions filled in the microcups comprise a dielectric solvent with charged pigment particles dispersed therein and the particles migrate under the influence of an electric field. The suspensions may optionally contain additional colorants which do not migrate in the electric field. The dispersion may be prepared according to methods well known in the art, such as U.S. Pat. Nos. 6,017,584, 5,914,806, 5,573,711, 5,403,518, 5,380,362, 4,680,103, 4,285,801, 4,093,534, 4,071,430, and 3,668,106, and as described in *IEEE Trans. Electron Devices*, ED-24, 827 (1977), and *J. Appl. Phys.* 49(9), 4820 (1978).

The suspending fluid medium is a dielectric solvent which preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as dichlorobenzotrifluoride, 3,4,5-trichlorobenzotrifluoride, chloropentafluoro-benzene, dichlorononane, pentachlorobenzene, and perfluoro solvents such as perfluorodecalin, perfluorotoluene, perfluoroxylene, FC-43, FC-70 and FC-5060 from 3M Company, St. Paul Minn., low molecular weight fluorine containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden, HT-200, and Fluorolink from Ausimont or Krytox Oils and Greases K-Fluid Series from DuPont, Del. In one preferred embodiment, poly(chlorotrifluoroethylene) is used as the dielectric solvent. In another preferred embodiment, poly (perfluoropropylene oxide) is used as the dielectric solvent.

The non-migrating fluid colorant may be formed from dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black (Pylam Products Co., Arizona), Thermoplastic Black X-70 (BASF), anthraquinone blue, anthraquinone yellow 114, anthraquinone reds 111 and 135, anthraquinone green 28 and Sudan Black B (Aldrich). Fluorinated dyes are particularly useful when perfluorinated solvents are used. In the case of a pigment, the pigment particles for generating the non-migrating fluid colorant may also be dispersed in the dielectric solvent and these colored particles are preferably uncharged. If the pigment particles for generating the non-migrating fluid colorant are charged, they preferably carry a charge which is opposite from that of the charged migrating pigment particles. If both types of pigment particles carry the same charge, then they should have different charge density or different electrophoretic mobility. The dye or pigment for generating the non-migrating fluid colorant must be chemically stable and compatible with other components in the suspension.

The charged migrating pigment particles are preferably white, and may be organic or inorganic pigments, such as $TiO_2$.

If colored migrating particles are used, they may be formed from phthalocyanine blue, phthalocyanine green, diarylide yellow, diarylide AAOT yellow, and quinacridone, azo, rhodamine, perylene pigment series (Sun Chemical), Hansa yellow G particles (Kanto Chemical), and Carbon Lampblack (Fisher). Submicron particle size is preferred. These particles should have acceptable optical characteristics, should not be swollen or softened by the dielectric solvent, and should be chemically stable. The resulting suspension must also be stable against sedimentation, creaming or flocculation under normal operating conditions.

The migrating pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soaps, polybutene succinimide, maleic anhydride copolymers, vinylpyridine copolymers, vinylpyrrolidone copolymers (such as Ganex, International Specialty Products), (meth)acrylic acid copolymers, and N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for producing the non-migrating fluid colorant may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For pigment suspensions, there are many possibilities. For a subtractive color system, the charged $TiO_2$ particles may be suspended in a dielectric fluid of cyan, yellow or magenta color. The cyan, yellow or magenta color may be generated via the use of a dye or a pigment. For an additive color system, the charged $TiO_2$ particles may be suspended in a dielectric solvent of red, green or blue color generated also via the use of a dye or a pigment. The red, green, blue color system is preferred for most applications.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. An electrophoretic display comprising (1) isolated electrophoretic cells formed from micro cups of well-defined size, shape and aspect ratio wherein said microcups are filled with an electrophoretic composition and the filled microcups are sealed with a sealing layer formed from a sealing composition having a specific gravity lower than that of the electrophoretic composition, and (2) an in-plane switching mode.

2. The electrophoretic display of claim 1 wherein each of said isolated electrophoretic cells has two in-plane electrodes.

3. The electrophoretic display of claim 1 wherein each of said isolated electrophoretic cells has one in-plane electrode.

4. The electrophoretic display of claim 1 wherein the microcups have a top opening ranging from about $10^2$ to about $1 \times 10^6$ $\mu m^2$.

5. The electrophoretic display of claim 4 wherein the microcups have a top opening ranging from about $10^3$ to about $1 \times 10^5$ $\mu m^2$.

6. The electrophoretic display of claim 1 wherein the microcups have a depth in the range of about 5 to about 200 microns.

7. The electrophoretic display of claim 6 wherein the microcups have a depth in the range of about 20 to about 100 microns.

8. The electrophoretic display of claim 1 wherein the microcups have an opening to total area ratio in the range of from about 0.2 to about 0.95.

9. An electrophoretic display comprising isolated cells formed from microcups of well-defined size, shape and aspect ratio wherein said microcups are filled with an electrophoretic composition comprising charged particles dispersed in a dielectric solvent or solvent mixture and the filled microcups are sealed with a sealing layer formed from a sealing composition having a specific gravity lower than that of the electrophoretic composition and each of said isolated cells comprises a transparent viewing layer on one side and a layer comprising one common electrode and an in-plane electrode on the opposite side.

10. The electrophoretic display of claim 9 wherein each of said isolated cells further comprising a separate background layer.

11. The electrophoretic display of claim 9 wherein said transparent viewing layer is colorless.

12. The electrophoretic display of claim 10 wherein said separate background layer is on top of the layer comprising one common electrode and an in-plane electrode.

13. The electrophoretic display of claim 10 wherein said separate background layer is underneath the layer comprising one common electrode and an in-plane electrode.

14. The electrophoretic display of claim 9 wherein said layer comprising one common electrode and an in-plane electrode serves as a background layer and the in-plane electrode is white or colored.

15. The electrophoretic display of claim 9 wherein the display is a monochrome display.

16. The electrophoretic display of claim 15 wherein said dielectric solvent is clear and colorless.

17. The electrophoretic display of claim 16 wherein said charged particles are of the white color and said cells have a background of one color.

18. The electrophoretic display of claim 17 wherein said background color is black, red, green, blue, yellow, cyan or magenta.

19. The electrophoretic display of claim 16 wherein said charged particles are of one color and said cells have a background of the white color.

20. The electrophoretic display of claim 19 wherein said charged particles are black, red, green, blue, yellow, cyan or magenta.

21. The electrophoretic display of claim 16 wherein said charged particles are of mixed colors in all of said cells which have a background of one color.

22. The electrophoretic display of claim 21 wherein the mixed colors are two or more colors selected from the group consisting of black, white, red, green, blue, yellow, cyan and magenta.

23. The electrophoretic display of claim 22 wherein said background is of a color selected from the group consisting of black, white, red, green, blue, yellow, cyan and magenta.

24. The electrophoretic display of claim 9 wherein said display is a multiple color display.

25. The electrophoretic display of claim 24 wherein said charged particles are of the white color and said cells have background of different colors.

26. The electrophoretic display of claim 24 wherein said charged particles are of the black color and said cells have background of different colors.

27. The electrophoretic display of claim 24 wherein said cells are filled with electrophoretic compositions comprising charged particles of different colors dispersed in a dielectric solvent or solvent mixture and all of said cells have a background of the white color.

28. The electrophoretic display of claim 24 wherein said cells are filled with electrophoretic compositions comprising charged particles of different colors dispersed in a dielectric solvent or solvent mixture and all of said cells have a background of the black color.

29. The electrophoretic display of claim 9 wherein said transparent viewing layer is colored or comprises a color filter.

30. The electrophoretic display of claim 29 wherein each of said isolated cells further comprising a separate background layer which is on top of the layer comprising one common electrode and an in-plane electrode.

31. The electrophoretic display of claim 29 wherein each of said isolated cells further comprising a separate background layer which is underneath the layer comprising one common electrode and an in-plane electrode.

32. The electrophoretic display of claim 29 wherein said layer comprising one common electrode and an in-plane electrode serves as a background layer and the in-plane electrode is white or colored.

33. The electrophoretic display of claim 29 wherein said charged particles are of the white color and said cells have a background of the black color.

34. The electrophoretic display of claim 33 wherein all said cells have the transparent viewing layer of the same color.

35. The electrophoretic display of claim 33 wherein said cells have the transparent viewing layer of different colors.

36. A process for the manufacture of an electrophoretic display having isolated cells formed from microcups having well defined size, shape and aspect ratio, said process comprises
   a) forming a layer by coating a radiation curable material over a transparent insulator substrate;
   b) forming microcups on the radiation curable material by microembossing or imagewise exposure to radiation;
   c) filling the microcups with an electrophoretic composition;
   d) sealing the microcups with a sealing composition having a specific gravity lower than that of the electrophoretic composition; and
   e) laminating the sealed microcups with a substrate comprising one common electrode and an in-plane electrode over each of said sealed microcups.

37. The process for the manufacture of an electrophoretic display of claim 36 wherein said substrate comprising one common electrode and an in-plane electrode is coated with an adhesive.

38. A process for the manufacture of an electrophoretic display having isolated cells formed from microcups having well defined size, shape and aspect ratio, said process comprises
   a) forming a layer by coating a radiation curable material over a substrate comprising common electrodes and in-plane electrode;
   b) forming microcups on the radiation curable material by microembossing or imagewise exposure to radiation, whereby each of said microcups is on the substrate comprising one common electrode and an in-plane electrode;
   c) filling the microcups with an electrophoretic composition;
   d) sealing the microcups with a sealing composition having a specific gravity lower than that of the electrophoretic composition; and
   e) laminating the sealed microcups with a transparent insulator substrate.

39. The process for the manufacture of an electrophoretic display of claim 38 wherein said transparent insulator substrate is coated with an adhesive.

40. The process of claim 36 wherein the microcups have a top opening ranging from about $10^2$ to about $1\times10^6$ $\mu m^2$.

41. The process of claim 38 wherein the microcups have a top opening ranging from about $10^2$ to about $1\times10^6$ $\mu m^2$.

42. The process of claim 36 wherein said transparent insulator substrate is colorless.

43. The process of claim 42 wherein said cells have a background of the same color and are filled with an electrophoretic composition comprising charged particles of the same color dispersed in a clear colorless dielectric solvent.

44. The process of claim 42 wherein said cells have background of different colors and are filled with an electrophoretic composition comprising charged particles of the same color dispersed in a clear colorless dielectric solvent.

45. The process of claim 42 wherein said cells have a background of the same color and are filled with electrophoretic compositions comprising charged particles of different colors dispersed in a clear colorless dielectric solvent.

46. The process of claim 38 wherein said transparent insulator substrate is colorless.

47. The process of claim 46 wherein said cells have a background of the same color and are filled with an electrophoretic composition comprising charged particles of the same color dispersed in a clear colorless dielectric solvent.

48. The process of claim 46 wherein said cells have background of different colors and are filled with an electrophoretic composition comprising charged particles of the same color dispersed in a clear colorless dielectric solvent.

49. The process of claim 46 wherein said cells have a background of the same color and are filled with electrophoretic compositions comprising charged particles of different colors dispersed in a clear colorless dielectric solvent.

50. The process of claim 36 wherein said transparent insulator substrate is colored.

51. The process of claim 50 wherein said cells have a background of the black color and are filled with an electrophoretic composition comprising charged particles of the white color dispersed in a clear colorless dielectric solvent.

52. The process of claim 51 wherein said cells have the transparent insulator substrate of the same color.

53. The process of claim 51 wherein said cells have the transparent insulator substrate of different colors.

54. The process of claim 38 wherein said transparent insulator substrate is colored.

55. The process of claim 54 wherein said cells have a background of the black color and are filled with an electrophoretic composition comprising charged particles of the white color dispersed in a clear colorless dielectric solvent.

56. The process of claim 55 wherein said cells have the transparent insulator substrate of the same color.

57. The process of claim 55 wherein said cells have the transparent insulator substrate of different colors.

58. The electrophoretic display of claim 9 wherein a substrate comprising an array of thin film transistors is used as the layer comprising one common electrode and an in-plane electrode.

59. The electrophoretic display of claim 1 wherein said sealing composition is a radiation, heat or moisture curable composition.

60. The electrophoretic display of claim 1 wherein said sealing composition comprises a material selected from the group consisting of acrylates, methacrylates, styrene, α-methylstyrene, butadiene, isoprene, allylacrylate, polyvalent acrylate, polyvalent methacrylate, cyanoacrylates, polyvalent vinyl, polyvalent epoxide, polyvalent isocyanate, polyvalent allyl and oligomers or polymers containing crosslinkable functional groups.

61. The electrophoretic display of claim 1 wherein said sealing composition comprises a thermoplastic elastomer.

62. The electrophoretic display of claim 61 wherein said thermoplastic elastomer is a di-block or tri-block copolymer of styrene or α-methylstyrene.

63. The electrophoretic display of claim 61 wherein said thermoplastic elastomer is SB (poly(styrene-b-butadiene)), SBS (poly(styrene-b-butadiene-b-styrene)), SIS (poly(styrene-b-isoprene-b-styrene)), SEBS (poly(styrene-b-ethylene/butylenes-b-styrene))poly(styrene-b-dimethylsiloxane-b-styrene), poly(α-methylstyrene-b-isoprene), poly(α-methylstyrene-b-isoprene-b-α-methylstyrene), poly(α-methylstyrene-b-propylene sulfide-b-α-methylstyrene) or poly(α-methylstyrene-b-dimethylsiloxane-b-α-methylstyrene).

64. The electrophoretic display of claim 9 wherein said sealing composition is a radiation, heat or moisture curable composition.

65. The electrophoretic display of claim 9 wherein said sealing composition comprises a material selected from the group consisting of acrylates, methacrylates, styrene, α-methylstyrene, butadiene, isoprene, allylacrylate, polyvalent acrylate, polyvalent methacrylate, cyanoacrylates, polyvalent vinyl, polyvalent epoxide, polyvalent isocyanate, polyvalent allyl and oligomers or polymers containing crosslinkable functional groups.

66. The electrophoretic display of claim 9 wherein said sealing composition comprises a thermoplastic elastomer.

67. The electrophoretic display of claim 66 wherein said thermoplastic elastomer is a di-block or tri-block copolymer of styrene or α-methylstyrene.

68. The electrophoretic display of claim 66 wherein said thermoplastic elastomer is SB (poly(styrene-b-butadiene)), SBS (poly(styrene-b-butadiene-b-styrene)), SIS (poly(styrene-b-isoprene-b-styrene)), SEBS (poly(styrene-b-ethylene/butylenes-b-styrene))poly(styrene-b-dimethylsiloxane-b-styrene), poly(α-methylstyrene-b-isoprene), poly(α-methylstyrene-b-isoprene-b-α-methylstyrene), poly(α-methylstyrene-b-propylene sulfide-b-α-methylstyrene) or poly(α-methylstyrene-b-dimethylsiloxane-b-α-methylstyrene).

69. The process of claim 36 wherein steps (c) and (d) are accomplished by (1) filling a mixture of the sealing composition and the electrophoretic composition, and (2) sealing the filled microcups by curing the sealing composition during or after it phase separates and forms a supernatant layer above the electrophoretic composition.

70. The process of claim 36 wherein step (d) is accomplished by (1) overcoating onto the electrophoretic composition with the sealing composition, and (2) curing said sealing composition.

71. The process of claim 38 wherein steps (c) and (d) are accomplished by (1) filling a mixture of the sealing composition and the electrophoretic composition, and (2) sealing the filled microcups by curing the sealing composition during or after it phase separates and forms a supernatant layer above the electrophoretic composition.

72. The process of claim 38 wherein step (d) is accomplished by (1) overcoating onto the electrophoretic composition with the sealing composition, and (2) curing said sealing composition.

73. The electrophoretic display of claim 9 wherein said layer comprising one common electrode and an in-plane electrode comprises one common electrode and two in-plane electrodes.

74. The electrophoretic display of claim 9 wherein said layer comprising one common electrode and an in-plane electrode comprises one common electrode and one in-plane electrode.

* * * * *

UNITED STATES PATENT AND TRADEMARK OFFICE
CERTIFICATE OF CORRECTION

PATENT NO. : 6,885,495 B2  
DATED : April 26, 2005  
INVENTOR(S) : Rong-Chang Liang et al.

Page 1 of 1

It is certified that error appears in the above-identified patent and that said Letters Patent is hereby corrected as shown below:

Column 6,  
Line 51, move "Preparation of the Male Mold" to the line immediately below.

Column 7,  
Line 28, change "naphthate" to -- naphthalate --;  
Line 51, change "mode" to -- mold --.

Column 8,  
Line 34, add -- After -- at beginning of the line;  
Line 41, change "allyacrylate" to -- allylacrylate --.

Column 9,  
Line 34, change "norbonene" to -- norbornene --;  
Line 40, change "SBS(poly(styrene-bbutadiene-b-styrene))" to -- SBS(poly(styrene-b-butadiene-b-styrene)) --.

Column 10,  
Line 9, change "naphthate" to -- naphthalate --;  
Line 20, change "he" to -- be --.

Column 12,  
Line 2, change "micro cups" to -- microcups --.

Column 14,  
Line 7, change "in-plane electrode" to -- in-plane electrodes --.

Signed and Sealed this

Fourth Day of October, 2005

JON W. DUDAS  
*Director of the United States Patent and Trademark Office*